United States Patent
Ohashi et al.

(10) Patent No.: US 10,196,514 B2
(45) Date of Patent: Feb. 5, 2019

(54) THERMOPLASTIC POLYESTER ELASTOMER COMPOSITION

(71) Applicant: TOYOBO CO., LTD., Osaka (JP)

(72) Inventors: Tadamine Ohashi, Shiga (JP); Yasuto Fujii, Shiga (JP); Junichi Nakao, Shiga (JP)

(73) Assignee: TOYOBO CO., LTD., Osaka (JP)

(*) Notice: Subject to any disclaimer, the term of this patent is extended or adjusted under 35 U.S.C. 154(b) by 77 days.

(21) Appl. No.: 15/319,017

(22) PCT Filed: Jun. 17, 2015

(86) PCT No.: PCT/JP2015/067416
§ 371 (c)(1),
(2) Date: Dec. 15, 2016

(87) PCT Pub. No.: WO2015/194583
PCT Pub. Date: Dec. 23, 2015

(65) Prior Publication Data
US 2017/0130046 A1 May 11, 2017

(30) Foreign Application Priority Data
Jun. 19, 2014 (JP) .................................. 2014-126111

(51) Int. Cl.
| | | |
|---|---|---|
| C08L 67/02 | (2006.01) | |
| F02M 35/12 | (2006.01) | |
| F02M 35/10 | (2006.01) | |
| F02M 35/02 | (2006.01) | |
| C08K 5/04 | (2006.01) | |
| C08K 5/29 | (2006.01) | |
| C08K 5/36 | (2006.01) | |
| C08L 79/00 | (2006.01) | |
| F02M 35/104 | (2006.01) | |
| C08K 5/13 | (2006.01) | |
| C08K 5/372 | (2006.01) | |
| C08L 53/02 | (2006.01) | |

(52) U.S. Cl.
CPC ............. *C08L 67/02* (2013.01); *C08K 5/04* (2013.01); *C08K 5/13* (2013.01); *C08K 5/29* (2013.01); *C08K 5/36* (2013.01); *C08K 5/372* (2013.01); *C08L 67/025* (2013.01); *C08L 79/00* (2013.01); *F02M 35/0202* (2013.01); *F02M 35/10* (2013.01); *F02M 35/104* (2013.01); *F02M 35/10321* (2013.01); *F02M 35/1255* (2013.01); *C08L 53/025* (2013.01); *C08L 2201/08* (2013.01); *C08L 2205/03* (2013.01); *C08L 2207/04* (2013.01)

(58) Field of Classification Search
CPC ........ C08L 67/02; F02M 35/12; F02M 35/10; F02M 35/02

USPC ........................................................ 524/222
See application file for complete search history.

(56) References Cited

U.S. PATENT DOCUMENTS

| | | | | |
|---|---|---|---|---|
| 550,190 A | * | 11/1895 | Hasegawa ............... | B23B 51/10 408/207 |
| 5,550,190 A | * | 8/1996 | Hasegawa ............ | C08L 67/025 525/173 |
| 2009/0203871 A1 | * | 8/2009 | Maruyama ............. | C08G 63/64 528/303 |
| 2011/0098388 A1 | * | 4/2011 | Sakata ..................... | C08K 5/29 524/195 |

FOREIGN PATENT DOCUMENTS

| | | |
|---|---|---|
| JP | 2-173059 | 7/1990 |
| JP | 6-220274 | 8/1994 |
| JP | 8-277358 | 10/1996 |
| JP | 10-17657 | 1/1998 |
| JP | 2003-192778 | 7/2003 |
| JP | 2008-143962 | 6/2008 |
| JP | 2009-263648 | 11/2009 |
| JP | 2009263648 | * 11/2009 |
| JP | 2011-116856 | 6/2011 |
| JP | 2012-140532 | 7/2012 |
| JP | 2013-189550 | 9/2013 |

OTHER PUBLICATIONS

International Search Report dated Sep. 1, 2015 in International Application No. PCT/JP2015/067416.

* cited by examiner

*Primary Examiner* — Deve E Valdez
(74) *Attorney, Agent, or Firm* — Wenderoth, Lind & Ponack, L.L.P.

(57) ABSTRACT

The present invention provides a thermoplastic polyester elastomer composition which is flexible and exhibits excellent thermal aging resistance and water resistance. According to the present invention, there is provided a thermoplastic polyester elastomer composition wherein, to 100 parts by mass in total of a thermoplastic polyester elastomer (A) and a modified hydrogenated styrene-type elastomer (B), 0.1 to 10 part (s) by mass of a carbodiimide compound (C), 0.01 to 5 part (s) by mass of an antioxidant of a hindered phenol type (D) and 0.01 to 5 part (s) by mass of an antioxidant of a sulfur type (E) are contained, wherein the thermoplastic polyester elastomer (A) comprises a hard segment comprising a polyester constituted from an aromatic dicarboxylic acid and an aliphatic diol or an alicyclic diol and a soft segment comprising an aliphatic polyether as main constituent ingredients, wherein a content of the soft segment is 3 to 40% by mass, wherein a rate by mass of the above (A) to the above (B) ((A)/(B)) is from 95/5 to 40/60.

9 Claims, No Drawings

THERMOPLASTIC POLYESTER ELASTOMER COMPOSITION

TECHNICAL FIELD OF THE INVENTION

The present invention relates to a thermoplastic polyester elastomer composition which is flexible and exhibits excellent thermal aging resistance and water resistance. The present invention also relates to a molded product made from the thermoplastic polyester elastomer composition as such. To be more specific, the present invention relates to a thermoplastic polyester elastomer composition which is most suitable for intake parts of internal combustion engine such as air ducts, resonators, side branches and air cleaners.

BACKGROUND ART

With regard to the thermoplastic polyester elastomer, there have been already known the ones which contain crystalline polyester (such as polybutylene terephthalate (PBT) or polybutylene naphthalate (PBN)) as a hard segment and polyoxyalkylene glycol (such as poly(tetremethylene oxide)glycol (PTMG)) and/or polyester (such as polycaprolactone (PCL) and polybutylene adipate (PBA)) as soft segment(s). They have been practically used already (for example, Patent Documents 1 and 2).

However, it has been known that, although an elastomer of a polyester-polyether type using polyoxyalkylene glycol as a soft segment is excellent in terms of water resistance and low-temperature characteristics, such elastomer is inferior in terms of thermal aging resistance. Also, it has been known that, although an elastomer of a polyester-polyester type using polyester as a soft segment is excellent in terms of thermal aging resistance, such elastomer is inferior in terms of water resistance and low-temperature characteristics. Accordingly, there has been a demand for providing a thermoplastic polyester elastomer which has well-balanced thermal aging resistance and water resistance.

For example, there have been proposed a block polyetherester copolymer composition wherein polyamide resin, antioxidant of a hindered phenol type, antioxidant of a sulfur type and/or antioxidant of a phosphorus type are/is added to a polyether ester block copolymer (Patent Document 3); and a polyester elastomer resin composition wherein antioxidant of an aromatic amine type, antioxidant of a hindered phenol type, antioxidant of a sulfur type, antioxidant of a phosphorus type and/or polyamide resin are/is added to an elastomer of a polyester type (Patent Document 4). However, in accordance with the constitution as such, there is a problem that thermal aging resistance is still insufficient for car parts or particularly for the use wherein so much thermal aging resistance is required such as for parts around the engine of the car.

There has been also proposed a thermoplastic elastomer resin composition wherein a thermal resisting agent consisting of one or more of antioxidant of an aromatic amine type, antioxidant of a hindered phenol type, antioxidant of a sulfur type and antioxidant of a phosphorus type is/are added to a thermoplastic elastomer prepared by mixing a polyester elastomer consisting of a flexible polyester block copolymer and a highly hard polyester block copolymer with a dynamically cross-linked thermoplastic elastomer (Patent Document 5). Also, there has been proposed a thermoplastic elastomer resin composition wherein glycidyl-modified polyolefin, antioxidant and polyamide resin are added to a thermoplastic elastomer prepared by mixing polyester block copolymer having a hard segment constituted from terephthalic acid and other dicarboxylic acid with polyester resin (Patent Document 6).

However, although improvement in thermal aging resistance is achieved in Patent Document 5 and Patent Document 6, a problem that hydrolysis is apt to happen (which is a problem specific to a polyester resin) has not been solved yet.

PRIOR ART DOCUMENTS

Patent Documents

Patent Document 1: Japanese Patent Application Laid-Open (JP-A) No. 17657/98
Patent Document 2: Japanese Patent Application Laid-Open (JP-A) No. 2003-192778
Patent Document 3: Japanese Patent Application Laid-Open (JP-A) No. 173059/90
Patent Document 4: Japanese Patent Application Laid-Open (JP-A) No. 277358/96
Patent Document 5: Japanese Patent Application Laid-Open (JP-A) No. 2011-116856
Patent Document 6: Japanese Patent Application Laid-Open (JP-A) No. 2013-189550

DISCLOSURE OF THE INVENTION

Problem that the Invention is to Solve

The present invention has been achieved for solving the above problem being noted in the conventional thermoplastic polyester elastomer composition. An object of the present invention is to provide a thermoplastic polyester elastomer composition which is flexible and exhibits excellent thermal aging resistance and water resistance.

Means for Solving the Problem

The inventors of the present invention have carried out eager investigations for solving the above problem and, as a result, they have achieved the following invention. Thus, the present invention is as shown below.

[1] A thermoplastic polyester elastomer composition wherein, to 100 parts by mass in total of a thermoplastic polyester elastomer (A) and a modified hydrogenated styrene-type elastomer (B), 0.1 to 10 part(s) by mass of a carbodiimide compound (C), 0.01 to 5 part(s) by mass of an antioxidant of a hindered phenol type (D) and 0.01 to 5 part(s) by mass of an antioxidant of a sulfur type (E) are contained, wherein the thermoplastic polyester elastomer (A) comprises a hard segment comprising a polyester constituted from an aromatic dicarboxylic acid and an aliphatic diol or an alicyclic diol and a soft segment comprising an aliphatic polyether as main constituent ingredients, wherein a content of the soft segment is 3 to 40% by mass, wherein a rate by mass of the above (A) to the above (B) ((A)/(B)) is from 95/5 to 40/60, and wherein, in a tensile test measured in accordance with JIS K6251:2010, initial tensile elongation at break of a molded product produced from the thermoplastic polyester elastomer composition is 550% or more, a retention rate (%) of tensile elongation at break of the molded product after a thermal treatment at 150° C. for 250 hours is 70% or more, and a retention rate (%) of tensile elongation at break of the molded product after a treatment with boiling water of 100° C. for 350 hours is 60% or more.

[2] The thermoplastic polyester elastomer composition according to [1], wherein the hard segment which is a constituent ingredient of the thermoplastic polyester elastomer (A) is constituted from polybutylene terephthalate.

[3] The thermoplastic polyester elastomer composition according to [1] or [2], wherein the soft segment which is a constituent ingredient of the thermoplastic polyester elastomer (A) is constituted from poly(tetramethylene oxide) glycol (PTMG) and/or an addition polymer wherein ethylene oxide is added to poly(propylene oxide) glycol (addition polymer of PPG with EO).

[4] The thermoplastic polyester elastomer composition according to any of [1] to [3], wherein the modified hydrogenated styrene-type elastomer (B) is a modified hydrogenated block copolymer of styrene with butadiene.

[5] The thermoplastic polyester elastomer composition according to any of [1] to [4], wherein the carbodiimide compound (C) is a polycarbodiimide compound wherein a number of carbodiimide group is 2 to 50 and a content of isocyanate group is 0 to 5% by mass.

[6] The thermoplastic polyester elastomer composition according to any of [1] to [5], wherein the rate by mass of the thermoplastic polyester elastomer (A) to the modified hydrogenated styrene-type elastomer (B) ((A)/(B)) is from 95/5 to 65/35.

[7] A molded product made from the thermoplastic polyester elastomer composition according to any of [1] to [6].

[8] The molded product according to [7], wherein the molded product is intake parts of an internal combustion engine.

[9] The molded product according to [8], wherein the intake parts of an internal combustion engine are any of air ducts, resonators, side branches and air cleaners.

Advantages of the Invention

In accordance with the present invention, it is now possible to obtain a thermoplastic polyester elastomer composition which is flexible and exhibits excellent thermal aging resistance and water resistance.

BEST MODE FOR CARRYING OUT THE INVENTION

As hereunder, the present invention will be illustrated in detail.

The thermoplastic polyester elastomer (A) consists of a hard segment and a soft segment. Specifically, the thermoplastic polyester elastomer composition comprises a hard segment consisting of a polyester constituted from an aromatic dicarboxylic acid and an aliphatic diol or an alicyclic diol and a soft segment consisting of an aliphatic polyether as main constituent ingredients. As to the hard segment, it is preferred that the polyester constituted from an aromatic dicarboxylic acid and an aliphatic or alicyclic diol is 70% by mass or more, and more preferably 80% by mass or more. As to the soft segment, it is preferred that an aliphatic polyether is 70% by mass or more, and more preferably 80% by mass or more.

In the thermoplastic polyester elastomer (A) used in the present invention, common aromatic dicarboxylic acid is widely used as the aromatic dicarboxylic acid constituting the polyester which is the hard segment. Although there is no particular limitation therefor, terephthalic acid or 2,6-naphthalenedicarboxylic acid is preferred as the main aromatic dicarboxylic acid. As to terephthalic acid or 2,6-naphthalenedicarboxylic acid, it is preferred to be 70 molar % or more of the total acid ingredient and more preferred to be 80 molar % or more of the total acid ingredient. With regard to other acid ingredient, there may be exemplified an aromatic dicarboxylic acid such as diphenyldicarboxylic acid, isophthalic acid and 5-sodium sulfoisophthalate; an alicyclic dicarboxylic acid such as cyclohexanedicarboxylic acid and tetrahydrophthalic acid anhydride; and an aliphatic dicarboxylic acid such as succinic acid, glutaric acid, adipic acid, azelaic acid, sebacic acid, dodecane diacid, dimer acid and hydrogenated dimer acid. Other acid ingredients may used within such an extent that melting point of the thermoplastic polyester elastomer is not greatly lowered thereby. The amount thereof is preferred to be 30 molar % or less of the total acid ingredient and more preferred to be 20 molar % or less of the total acid ingredient.

In the thermoplastic polyester elastomer (A) according to the present invention, common aliphatic or alicyclic diol is widely used as the aliphatic or alicyclic diol constituting the polyester which is the hard segment. Although there is no particular limitation therefor, it is mostly preferred to be alkylene glycol having 2 to 8 carbons. To be more specific, there may be exemplified ethylene glycol, 1,3-propylene glycol, 1,4-butanediol, 1,6-hexanediol and 1,4-cyclohexanedimethanol. Among them, 1,4-butanediol or 1,4-cyclohexanedimethanol is preferred.

As to the ingredient constituting the polyester which is the above hard segment, that which is composed of a butylene terephthalate unit consisting of terephthalic acid and 1,4-butanediol or that which is composed of a butylene naphthalate unit consisting of 2,6-naphthalenedicarboxylic acid and 1,4-butanediol is preferred in view of physical properties, moldability and cost performance. That which is composed of a butylene terephthalate unit is particularly preferred.

Further, when an aromatic polyester which is suitable as a polyester constituting the hard segment in the thermoplastic polyester elastomer (A) according to the present invention is previously produced and then it is copolymerized with a soft segment ingredient, the aromatic polyester can be easily prepared according to a usual method for producing polyester. In addition, the polyester as such is preferred to have a number-average molecular weight of 10,000 to 40,000.

As to the aliphatic polyester which is the soft segment ingredient in the thermoplastic polyester elastomer (A) used in the present invention, there may be exemplified poly(alkylene oxide) glycols such as poly(ethylene oxide) glycol, poly(propylene oxide) glycol, poly(tetramethylene oxide) glycol, poly(hexamethylene oxide) glycol, a copolymer of ethylene oxide with propylene oxide, an addition polymer wherein ethylene oxide is added to poly(propylene oxide) glycol and a copolymer of ethylene oxide with tetrahydrofuran.

Among the above aliphatic polyethers, preferred ones are poly(tetramethylene oxide) glycol (PTMG), an addition polymer wherein ethylene oxide is added to poly(propylene oxide) glycol (addition polymer of PPG with EO) and a copolymerized glycol of ethylene oxide with tetrahydrofuran (copolymerized glycol of EO with THF). More preferred ones are poly(tetramethylene oxide) glycol (PTMG) and an addition polymer wherein ethylene oxide is added to poly(propylene oxide) glycol (addition polymer of PPG with EO). Number-average molecular weight of the soft segment as such is preferred to be about 300 to 6,000 in a copolymerized state.

A content (copolymerized amount) of the soft segment in the thermoplastic polyester elastomer (A) used in the present invention is 3 to 40% by mass. The content of the soft segment is preferred to be 5 to 40% by mass. It is more preferred to be 10 to 40% by mass and further preferred to be 20 to 40% by mass. When the content (copolymerized amount) of the soft segment is less than 3% by mass, flexibility and rubber elasticity as an elastomer are insufficient while, when it is more than 40% by mass, thermal resistance lowers.

Reduced viscosity of the thermoplastic polyester elastomer (A) used in the present invention is preferred to be 1.3 to 2.5 dl/g and more preferred to be 1.5 to 2.3 dl/g. Melting point of the thermoplastic polyester elastomer (A) used in the present invention is preferred to be 170 to 225° C., more preferred to be 170 to 220° C., and further preferred to be 180 to 210° C.

The thermoplastic polyester elastomer (A) used in the present invention can be produced by a known method. Examples thereof are a method wherein a lower alcohol diester of dicarboxylic acid, a low-molecular glycol in an excessive amount and a soft segment ingredient are subjected to transesterification in the presence of a catalyst and the resulting reaction product is subjected to polycondensation; and a method wherein a dicarboxylic acid, a glycol in an excessive amount and a soft segment ingredient are subjected to esterification reaction in the presence of a catalyst and the resulting reaction product is subjected to polycondensation.

The modified hydrogenated styrene-type elastomer (B) used in the present invention is such a one wherein a hydrogenated product of a copolymer of styrene with conjugated diene is modified. The copolymer of styrene with a conjugated diene is a block copolymer consisting of styrene block and diene block. Examples thereof are diblock copolymer, triblock copolymer and radial block copolymer. Examples of the diene block ingredient are butadiene block and isoprene block. Specific examples of the hydrogenated styrene-diene block copolymer are a styrene-ethylene.butylene-styrene block copolymer (SEBS) which is a hydrogenated product of block copolymer of styrene-butadiene-styrene (SBS); a styrene-ethylene.propylene-styrene block copolymer (SEPS) which is a hydrogenated product of block copolymer of styrene-isoprene-styrene (SIS); and a styrene-ethylene.ethylene.propylene-styrene block copolymer (SEEPS) which is a hydrogenated product of block copolymer of styrene-butadiene/isoprene-styrene (SBIS).

The modification of the hydrogenated styrene-type elastomer is preferred to be an acid modification which is conducted by a carboxyl group-containing unsaturated compound or an acid anhydride-containing unsaturated compound, or an epoxy modification which is conducted by an epoxy group-containing monomer. Specific examples of the carboxyl group-containing unsaturated compound are acrylic acid, methacrylic acid, crotonic acid, cinnamic acid, itaconic acid and maleic acid. Specific examples of the acid anhydride-containing unsaturated compound are maleic anhydride, itaconic anhydride, chloromaleic anhydride, citraconic anhydride, butenylsuccinic anhydride and tetrahydrophthalic anhydride. Specific examples of the epoxy group-containing monomer are glycidyl methacrylate, glycidyl acrylate, vinyl glycidyl ether and glycidyl ether of hydroxyalkyl (meth)acrylate. Among the modified hydrogenated styrene-type elastomers, preferred ones are a modified styrene-ethylene.butylene-styrene block copolymer (SEBS) and a modified styrene-ethylene.propylene-styrene block copolymer (SEPS).

The reason why modification is necessary for the hydrogenated styrene-type elastomer (B) is to make its compatibility with a thermoplastic polyester elastomer (A) better so that synergism by alloy can be achieved to the highest extent. It is surprising that thermal aging resistance is significantly improved when the modified hydrogenated styrene-type elastomer is compounded. In addition, compatibility becomes better by the modification whereby extruded strand upon melting and kneading can be produced in a stable manner without pulsation.

Number-average molecular weight of the modified hydrogenated styrene-type monomer (B) used in the present invention is preferred to be 30,000 to 80,000 and more preferred to be 40,000 to 60,000. Modified content of the hydrogenated styrene-type elastomer (B) is preferred to be 0.5 to 5.0% by mass, more preferred to be 1.0 to 3.0% by mass, and further preferred to be 1.5 to 2.5% by mass. The modified content means a content (copolymerized amount) of a compound (monomer) having a modified group in the modified hydrogenated styrene-type elastomer (B).

As to the modified hydrogenated styrene-type elastomer as such, "Tuftec M1943" manufactured by Asahi Chemicals may be used for example.

When the total amount of the thermoplastic polyester elastomer (A) and the modified hydrogenated styrene-type elastomer (B) in the present invention is taken as 100 parts by mass, the ratio by mass of the thermoplastic polyester elastomer (A) to the modified hydrogenated styrene-type elastomer (B) (i.e., (A)/(B)) is preferred to be from 95/5 to 40/60 and more preferred to be from 95/5 to 50/50. In order to significantly achieve the effect of the present invention, this ratio by mass is preferred to be from 95/5 to 65/35, more preferred to be from 90/10 to 70/30, and further preferred to be from 90/10 to 75/25. Out of the above range, flexibility, thermal resistance, moldability, appearance, etc. of the elastomer composition become insufficient whereby that is not preferred.

The carbodiimide compound (C) used in the present invention is a compound having a structure of —N=C=N— in a molecule. Examples of the compound having such a structure are the compounds of aliphatic carbodiimide, alicyclic carbodiimide and aromatic carbodiimide as well as polymers and copolymers having the structures as such.

The carbodiimide compound (C) used in the present invention is prepared, for example, by removing carbon dioxide from a diisocyanate compound. As to the diisocyanate, each of 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, 1,5-naphthylene diisocyanate, hexamethylene diisocyanate, dicyclohexylmethane diisocyanate, cyclohexane 1,4-diisocyanate, xylylene diisocyanate, isophorone diisocyanate, methylcyclohexane diisocyanate, tetramethyl-xylylene diisocyanate, 1,3,5-triisopropylphenylene 2,4-diisocyanate, etc. may be used solely or a copolymer obtained from two or more kinds of them may be used. Also, a branched structure may be introduced thereinto or a functional group other than carbodiimide group or isocyanate group may be introduced thereinto by means of copolymerization. Further, a part of or all of the terminal isocyanates may be sequestered so as to control a degree of polymerization or sequester the terminal isocyanate. As to the terminal sequestering agent, there may be used a monoisocyanate compound such as phenyl isocyanate, tolyl isocyanate, dimethylphenyl isocyanate, cyclohexyl isocyanate, butyl isocyanate or naphthyl isocyanate and a compound having —OH group, —COOH group, —SH group, —NH—R (R is hydrogen atom or alkyl group), etc.

As to the carbodiimide compound in the present invention, it is preferred to be a polycarbodiimide compound wherein a number of carbodiimide group is 2 to 50 and a content of isocyanate group is 0 to 5% by mass.

The number of carbodiimide group in the carbodiimide compound in the present invention is preferred to be 2 to 50, more preferred to be 5 to 30, and further preferred to be 10 to 20, in view of stability and handling. The number of carbodiimide group stands for a number of carbodiimide group in the carbodiimide molecule. When the polycarbodiimide compound is prepared from a diisocyanate compound, the number of carbodiimide group corresponds to a degree of polymerization. For example, when a polycarbodiimide compound is prepared by connecting 21 diisocyanate compounds in a chain-like manner, the degree of polymerization is 20 and the number of carbodiimide group in the molecular chain is 20. Usually, a polycarbodiimide compound is a mixture of molecules in various lengths and thus the number of carbodiimide group is expressed in a mean value. The number of carbodiimide group can be measured by a conventional method (i.e., a method wherein a carbodiimide compound is dissolved in an amine solution followed by conducting a back titration using hydrochloric acid: this method is based on a presumption that residual isocyanate group reacts with amine while all of other isocyanate group are converted to carbodiimide group). With regard to the number of carbodiimide group of a commercially available carbodiimide compound wherein terminal isocyanate group is sequestered, the value measured by the manufacturer may be adopted.

A carbodiimide compound having the number of carbodiimide group within the above range and being a solid at about room temperature can be made into powder. Therefore, the carbodiimide compound as such is excellent in terms of workability and compatibility upon mixing with the thermoplastic polyester elastomer and is also preferred in terms of uniform reactivity and resistance to bleeding out.

A content of the isocyanate group in the carbodiimide compound in the present invention is preferred to be 0 to 5% by mass, more preferred to be 0 to 3% by mass, and further preferred to be 1 to 3% by mass, in view of stability and handling. It is particularly preferred that the carbodiimide compound in the present invention is a carbodiimide compound derived from dicyclohexylmethane diisocyanate and isophorone diisocyanate and that the content of isocyanate group is within the above-mentioned range. Incidentally, the content of isocyanate group means a content (% by mass) of isocyanate group (NCO: 42 g/mol) in the carbodiimide compound. The content of isocyanate group can also be measured by a conventional method (i.e., a method wherein a carbodiimide compound is dissolved in an amine solution followed by conducting a back titration using hydrochloric acid) as same as that mentioned above.

A content of the carbodiimide compound (C) is 0.1 to 10 part(s) by mass, preferably 0.5 to 5 part(s) by mass, and more preferably 1 to 4 part(s) by mass to 100 parts by mass of the total amount of the thermoplastic polyester elastomer (A) and the modified hydrogenated styrene-type elastomer (B). When it is more than 10 parts by mass, flexibility may be deteriorated or mechanical properties, thermal resistance and melt viscosity may lower. When it is less than 0.1 part by mass, an amount of —N=C=N— in the composition may become small and improvement effect for resistance to hydrolysis and improvement effect for extruding properties may become inferior.

The carbodiimide compound (C) in the present invention reacts with residual hydroxyl group and carboxyl group of the thermoplastic polyester elastomer whereby an acid value thereof can be greatly lowered. It also quickly reacts with carboxylic acid generated by hydrolysis of the polyester elastomer whereby the acid value of the polyester elastomer composition can be always kept at low state. As a result thereof, it is now possible to prepare a polyester elastomer composition having excellent resistance to hydrolysis.

Examples of the antioxidant of a hindered phenol type (D) used in the elastomer composition of the present invention are 3,5-di-tert-butyl-4-hydroxytoluene, n-octadecyl-β-(4'-hydroxy-3',5'-di-tert-butylphenyl) propionate, tetrakis[methylene-3-(3',5'-di-tert-butyl-4'-hydroxyphenyl) propionate]methane, 1,3,5-trimethyl-2,4,6-tris(3',5'-di-tert-butyl-4'-hydroxybenzyl)benzene, calcium (3,5-di-tert-butyl-4-hydroxybenzyl-monoethyl-phosphate), triethylene glycol bis[3-(3-tert-butyl-5-methyl-4-hydroxyphenyl) propionate], 3,9-bis[1,1-dimethyl-2-{β-(3-tert-butyl-4-hydroxy-5-methylphenyl)propionyloxy}-ethyl]-2,4,8,10-tetraoxaspiro[5,5] undecane, bis[3,3-bis-(4'-hydroxy-3'-tert-butylphenyl)butyric acid]glycol ester, 2,2'-ethylidenebis(4,6-di-tert-butylphenol), N,N'-bis-[3-(3,5-di-tert-butyl-4-hydroxyphenyl) propionyl]hydrazine, 2,2'-oxamidebis[ethyl-3-(3,5-di-tert-butyl-4-hydroxyphenyl) propionate], 1,3,5-tris(3',5'-di-tert-butyl-4'-hydroxybenzyl)-s-triazine-2,4,6(1H,3H,5H)-trione, 1,3,5-tris-(4-tert-butyl-3-hydroxy-2,6-dimethylbenzyl) isocyanurate, 3,5-di-tert-butyl-4-hydroxycinnamic acid triester with 1,3,5-tris(2-hydroxyethyl)-s-triazine-2,4,6(1H,3H,5H)-trion e and N,N'-hexamethylenebis(3,5-di-tert-butyl-4-hydroxybenzenepropionamide). Among them, antioxidants of a hindered phenol type having 500 or more molecular weight are preferred and antioxidants of a hindered phenol type having 1,000 or more molecular weight are more preferred. To be more specific, N,N'-hexamethylenebis(3,5-di-tert-butyl-4-hydroxybenzenepropionamide) and tetrakis[methylene-3-(3',5'-di-tert-butyl-4'-hydroxyphenyl)propionate]methane are preferred and especially tetrakis[methylene-3-(3',5'-di-tert-butyl-4'-hydroxyphenyl) propionate]methane is preferred.

As to the antioxidant of a sulfur type (E) used in the elastomer composition of the present invention, there may be exemplified dilauryl 3,3'-thiodipropionate, dimyristyl 3,3'-thiodipropionate, distearyl 3,3'-thiodipropionate, lauryl stearyl 3,3'-thiodipropionate, dilauryl thiodipropionate, dioctadecyl sulfide and pentaerythritol tetra(β-lauryl-thiopropionate). Among them, compounds of a thiodipropionate type are particularly preferred.

Each of the contents of the above antioxidants (D) and (E) to 100 parts by mass in total of the thermoplastic polyester elastomer (A) and the modified hydrogenated styrene-type elastomer (B) is 0.01 to 5 part(s) by mass, preferably 0.05 to 3 part(s) by mass, and more preferably 0.1 to 1.5 part(s) by mass. When the amount is less than 0.01 part by mass, the aimed improvement effect for thermal resistance is hardly achieved while, when it is more than 5 parts by mass, bleeding out may happen which leads to bad appearance whereby that is not preferred.

It is essential that the above antioxidants (D) and (E) are compounded in a combined manner. When any of them is solely compounded, the aimed improvement effect for thermal resistance cannot be achieved. Although the clear reason therefor is ambiguous, it is estimated that the above antioxidants (D) and (E) not only play a role as known radical chain preventers and peroxide decomposing agents but also express the high thermal resistance due to any synergism.

The thermoplastic polyester elastomer composition of the present invention may also be compounded with various additives other than the above antioxidants (D) and (E), depending upon the object and within such an extent that the effect of the present invention is not hindered thereby. As to the additives, there may be exemplified known light stabilizers of hindered amine type, triazole type, benzophenone type, benzoate type, nickel type, salicylic type, etc., antistatic agents, lubricants, adjusting agents for molecular weights such as peroxides, inactivating agents for metal, organic and inorganic nucleating agents, neutralizing agents, antacids, antibacterial agents, fluorescent whiteners, fillers, flame retardants, auxiliary flame retardants and organic and inorganic pigments.

In the thermoplastic polyester elastomer composition of the present invention, it is preferred that the total amount of the thermoplastic polyester elastomer (A), the modified hydrogenated styrene-type elastomer (B), the carbodiimide compound (C), the antioxidant of a hindered phenol type (D) and the antioxidant of a sulfur type (E) occupy 80% by mass or more. It is more preferred that they occupy 90% by mass or more and further preferred that they occupy 95% by mass or more.

As to a method for producing the thermoplastic polyester elastomer composition of the present invention, the ingredients of the present invention which are the thermoplastic polyester elastomer, the modified hydrogenated styrene-type elastomer, the carbodiimide compound, etc. may be mixed in a predetermined compounding ratio followed by being subjected to melt kneading. The mixing may be carried out using Henschel mixer, ribbon blender, V-shaped blender, etc. The melt kneading may be carried out using Banbury mixer, kneader-type heater, uniaxial or biaxial melt kneading extruder, etc.

In a tensile test measured in accordance with JIS K6251: 2010, initial tensile elongation at break of a molded product (test piece) produced from the thermoplastic polyester elastomer composition of the present invention is 550% or more, a retention rate (%) of tensile elongation at break of the molded product after a thermal treatment at 150° C. for 250 hours is 70% or more, and a retention rate (%) of tensile elongation at break of the molded product after a treatment with boiling water of 100° C. for 350 hours is 60% or more. The tensile elongation at break (elongation upon breakage) is a value which is measured in accordance with JIS K6251: 2010. The test piece is prepared by the method mentioned in Examples. The initial tensile elongation at break is a measured value for the test piece which is not treated yet. In the thermal treatment, the test piece is allowed to stand for 250 hours in a hot air oven at 150° C. The retention rate of tensile elongation at break after the thermal treatment is a retention rate to the initial tensile elongation at break. In the treatment with boiling water, the test piece is allowed to stand for 350 hours while immersed in boiling water of 100° C. The retention rate of tensile elongation at break after the treatment with boiling water is a retention rate to the initial tensile elongation at break.

The thermoplastic polyester elastomer composition of the present invention can achieve those characteristics by means of having the above-mentioned constitution. The initial tensile elongation at break is preferred to be 580% or more. The retention rate of tensile elongation at break after the thermal treatment is preferred to be 80% or more. The retention rate of tensile elongation at break after the treatment with boiling water is preferred to be 70% or more, more preferred to be 80% or more, and further preferred to be 90% or more.

Since the thermal aging resistance and the water resistance can be evaluated by the degree of retention of the tensile elongation at break, the retention rate of tensile elongation at break is used for them.

Further, the initial tensile strength at break is preferred to be 8 MPa or more, more preferred to be 10 MPa or more, and further preferred to be 15 MPa or more.

The thermoplastic polyester elastomer composition of the present invention is flexible and exhibits excellent thermal aging resistance and water resistance. A molded product prepared from this composition is suitable for intake parts of an internal combustion engine. It is particularly suitable for air ducts, resonators, side branches and air cleaners among the intake parts of the internal combustion engine.

EXAMPLES

As hereunder, the present invention will be more specifically illustrated by means of Examples. The present invention is not limited by the following Examples but also can be carried out after being modified within a range which can adapt to the gist mentioned either before or after. All of them are covered by the technical coverage of the present invention. Incidentally, each of the measurements in this specification is in accordance with the following methods.

[Analysis of Composition of the Thermoplastic Polyester Elastomer]

Composition of the thermoplastic polyester elastomer was determined from the integral ratio by conducting a $^1$H-NMR analysis in heavy chloroform solution using Jeminy 200 (a nuclear magnetic resonance (NMR) spectrometer) manufactured by Varian.

[Reduced Viscosity of the Thermoplastic Polyester Elastomer]

The resin (0.05 g) was dissolved in 25 mL of a mixed solvent (phenol/tetrachloroethane=60/40 (ratio by mass)) and the measurement was conducted at 30° C. using an Ostwald viscometer.

[Melting Point (Tm) of the Thermoplastic Polyester Elastomer]

The resin was dried in vacuo at 50° C. for 15 hours. Then, the resin was subjected to the measurement using a differential scanning calorimeter DSC-50 (manufactured by Shimadzu) at the temperature-rising rate of 20° C. per minute from room temperature. The endothermic peak temperature due to the melting was adopted as a melting point. As to the sample for the measurement, 10 mg thereof was weighed in a pan made of aluminum (Catalog No. 900793.901 manufactured by TA Instruments) followed by making into a tightly sealed state using a cover made by aluminum (Catalog No. 900794.901 manufactured by TA Instruments) and the measurement was conducted in an argon atmosphere.

[Tensile Strength at Break and Tensile Elongation at Break]

Strength and elongation of the composition upon tensile breakage were measured in accordance with JIS K6251: 2010. Test pieces were prepared in the following manner. The composition was dried in vacuo at 100° C. for 8 hours. Then, the composition was subjected to injection molding into a plate of 100 mm×100 mm×2 mm using an injection molding machine (model-SAV manufactured by Yamashiro Seiki) with the cylinder temperature of Tm+20° C. and the metal mold temperature of 30° C. After that, the plate was punched into test pieces in a shape of dumbbell No. 3.

[Thermal Treatment: Thermal Aging Resistance Test]

The above-prepared test piece in a shape of dumbbell No. 3 was allowed to stand in a hot air oven of 150° C. for 250 hours. Then, the test piece was taken out and subjected to the measurement of tensile elongation at break in accordance with JIS K6251:2010 the same as before. Then the retention rate of tensile elongation at break was calculated by the following formula and evaluated. The initial tensile elongation at break is the tensile elongation at break before the thermal treatment.

Retention rate of tensile elongation at break (%)=tensile elongation at break after the thermal treatment/initial tensile elongation at break×100

[Treatment with Boiling Water: Test for Resistance to Hydrolysis]

The above-prepared test piece in a shape of dumbbell No. 3 was immersed in boiling water of 100° C., allowed to stand for 350 hours. Then, the test piece was taken out and subjected to the measurement of tensile elongation at break in accordance with JIS K6251:2010 the same as before. Then the retention rate of tensile elongation at break was calculated by the following formula and evaluated. The initial tensile elongation at break is the tensile elongation at break before the treatment with boiling water.

Retention rate of tensile elongation at break (%)=tensile elongation at break after the treatment with boiling water/initial tensile elongation at break×100

[Stability of Extruded Strand]

Stability of the extruded strand upon melting and kneading using a biaxial extruder was evaluated according to the following standard.

○○: The strand was not snapped at all but stably extruded.

○: Although the strand was not snapped, variations in the size was observed.

Δ: The strand was sometimes snapped.

x: The strand was frequently snapped and it was difficult to draw out the strand in a continued manner.

[Production of the Thermoplastic Polyester Elastomers (A-1, A-2, A-3 and A-4)]

Dimethyl terephthalate, 1,4-butanediol and poly(tetramethylene oxide) glycol having number-average molecular weight of 1,000 were used as materials. The thermoplastic polyester elastomers A-1, A-2, A-3 and A-4 having the compositions as shown in Table 1 were synthesized therefrom. Compositions and various physical properties of the resulting thermoplastic polyester elastomers are shown in Table 1.

TABLE 1

| Abbreviation | Composition (% by mass) | | Physical properties | |
| --- | --- | --- | --- | --- |
| | PBT | PTMG | Reduced viscosity (dl/g) | Melting point (° C.) |
| A-1 | 64 | 36 | 1.75 | 203 |
| A-2 | 75 | 25 | 1.52 | 212 |
| A-3 | 91 | 9 | 2.08 | 222 |
| A-4 | 51 | 49 | 1.95 | 182 |

PBT: polybutylene terephthalate
PTMG: poly(tetremethylene oxide)glycol

[Hydrogenated Styrene-Type Elastomer (B)]

"Tuftec M1943" manufactured by Asahi Kasei Chemicals was used as a hydrogenated block copolymer of styrene-butadiene modified with maleic acid (B-1).

"Tuftec H1052" manufactured by Asahi Kasei Chemicals was used as a unmodified hydrogenated block copolymer of styrene-butadiene (B-2).

[Production of a Carbodiimide Compound (C-1)]

To 262 g of 4,4'-dicyclohexylmethane diisocyanate (hereinafter, it may also be referred to as HMDI) was added 1.5 g of 3-methyl-1-phenyl-2-phosphorene 1-oxide as a catalyst for carbodimidation followed by subjecting to condensation reaction at 185° C. for 28 hours together with bubbling of nitrogen thereinto to give a polycarbodiimide compound (C-1) derived from HMDI (number of carbodiimide group=16; content of isocyanate group=2.0% by mass).

[Carbodiimide Compound (C-2)]

Commercially available polycarbodiimide compound ("HMV-15CA" manufactured by Nisshinbo Chemical: an aliphatic polycarbodiimide compound; number of carbodiimide group=16; content of isocyanate group=0% by mass) was used.

[Antioxidants]

Abbreviations and structural formulae of the antioxidants used in the following Examples are shown in Table 2.

TABLE 2

| Abbreviation | Type | Structural formula |
| --- | --- | --- |
| D-1 | hindered phenol type | $\left( \text{HO} - \underset{\text{t-Bu}}{\overset{\text{t-Bu}}{\bigcirc}} - (CH_2)_2 - \overset{O}{\underset{\|}{C}} - O - CH_2 \right)_4 C$ |
| D-2 | hindered phenol type | $\left( \text{HO} - \underset{\text{t-Bu}}{\overset{\text{t-Bu}}{\bigcirc}} - (CH_2)_2 - \overset{O}{\underset{\|}{C}} - \underset{H}{N} - (CH_2)_3 \right)_2$ |

TABLE 2-continued

| Abbreviation | Type | Structural formula |
|---|---|---|
| E | sulfur type | $\left( H_{25}C_{12}-O-\overset{O}{\underset{\|}{C}}-(CH_2)_2-\right)_2 S$ |
| — | phosphorus type | $\left( \text{t-Bu}-\underset{\text{t-Bu}}{\bigcirc}-O-\right)_3 P$ |

Examples 1 to 11, and Comparative Examples 1 to 9

The above thermoplastic polyester elastomer (A), hydrogenated styrene-type elastomer (B), carbodiimide compound (C) and antioxidant were subjected to a dry blending in compounding ratios as shown in Tables 3 and 4. The resulting mixture was melted and kneaded at the temperature condition of 220° C. to 250° C. using a biaxial extruder (manufactured by TOSHIBA MACHINE CO., LTD.) having a diameter of 35 mm, then extruded into a strand form and cooled with water to make into pellets using a pelletizer. The resulting pellets were dried in vacuo at 100° C. for 5 hours to give a thermoplastic polyester elastomer composition. Results of the evaluation are shown in Tables 3 and 4.

TABLE 3

| | | | | Example 1 | Example 2 | Example 3 | Example 4 | Example 5 | Example 6 |
|---|---|---|---|---|---|---|---|---|---|
| Compounding composition (part(s) by mass) | thermoplastic polyester elastomer | | A-1 | 90 | 80 | 80 | 70 | 80 | 80 |
| | | | A-2 | | | | | | |
| | | | A-3 | | | | | | |
| | | | A-4 | | | | | | |
| | hydrogenated styrene-type elastomer | | B-1 | 10 | 20 | 20 | 30 | 20 | 20 |
| | | | B-2 | | | | | | |
| | carbodiimide compound | | C-1 | 1.0 | | 1.0 | 1.0 | 5.0 | 1.0 |
| | | | C-2 | | 1.0 | | | | |
| | antioxidant of a hindered phenol type | | D-1 | 0.5 | 0.5 | 0.5 | 0.5 | 0.5 | 2.0 |
| | | | D-2 | | | | | | |
| | antioxidant of a sulfur type | | E | 0.5 | 0.5 | 0.5 | 0.5 | 0.5 | 2.0 |
| | antioxidant of a phosphorus type | | — | | | | | | |
| Characteristics | (initial) tensile strength at break | | MPa | 27 | 21 | 21 | 17 | 20 | 21 |
| | (initial) tensile elongation at break | | % | 690 | 670 | 670 | 630 | 660 | 670 |
| | retention rate of tensile elongation at break after thermal treatment | | % | 81 | 85 | 86 | 89 | 86 | 91 |
| | retention rate of tensile elongation at break after treatment with boiling water | | % | 97 | 98 | 98 | 99 | 100 | 97 |
| | stability of extruded strand | | — | ⊙ | ○ | ○ | ○ | ○ | ○ |

| | | | | Example 7 | Example 8 | Example 9 | Example 10 | Example 11 |
|---|---|---|---|---|---|---|---|---|
| Compounding composition (part(s) by mass) | thermoplastic polyester elastomer | | A-1 | 80 | | | | 50 |
| | | | A-2 | | 90 | 80 | | |
| | | | A-3 | | | | 80 | |
| | | | A-4 | | | | | |
| | hydrogenated styrene-type elastomer | | B-1 | 20 | 10 | 20 | 20 | 50 |
| | | | B-2 | | | | | |
| | carbodiimide compound | | C-1 | 1.0 | 1.0 | 1.0 | 1.0 | 1.0 |
| | | | C-2 | | | | | |
| | antioxidant of a hindered phenol type | | D-1 | | | 0.5 | 0.5 | 0.5 |
| | | | D-2 | | 0.5 | | | |
| | antioxidant of a sulfur type | | E | 0.5 | 0.5 | 0.5 | 0.5 | 0.5 |
| | antioxidant of a phosphorus type | | — | | | | | |
| Characteristics | (initial) tensile strength at break | | MPa | 21 | 33 | 25 | 35 | 10 |
| | (initial) tensile elongation at break | | % | 670 | 610 | 630 | 600 | 550 |
| | retention rate of tensile elongation at break after thermal treatment | | % | 82 | 92 | 95 | 98 | 99 |
| | retention rate of tensile elongation at break after treatment with boiling water | | % | 97 | 72 | 78 | 73 | 98 |
| | stability of extruded strand | | — | ○ | ⊙ | ○ | ○ | ○ |

TABLE 4

| | | | Comparative Example 1 | Comparative Example 2 | Comparative Example 3 | Comparative Example 4 | Comparative Example 5 |
|---|---|---|---|---|---|---|---|
| Compounding composition (part(s) by mass) | thermoplastic polyester elastomer | A-1 | 100 | 80 | 80 | 80 | 80 |
| | | A-2 | | | | | |
| | | A-3 | | | | | |
| | | A-4 | | | | | |
| | hydrogenated styrene-type elastomer | B-1 | | 20 | 20 | 20 | |
| | | B-2 | | | | | 20 |
| | carbodiimide compound | C-1 | 1.0 | 1.0 | 1.0 | 1.0 | 1.0 |
| | | C-2 | | | | | |
| | antioxidant of a hindered phenol type | D-1 | 0.5 | | | 1.0 | 0.5 |
| | | D-2 | | | | | |
| | antioxidant of a sulfur type | E | 0.5 | | | 1.0 | 0.5 |
| | antioxidant of a phosphorus type | — | | | | | |
| Characteristics | (initial) tensile strength at break | MPa | 31 | 22 | 21 | 21 | 21 |
| | (initial) tensile elongation at break | % | 700 | 660 | 670 | 660 | 670 |
| | retention rate of tensile elongation at break after thermal treatment | % | 17 | 0 | 41 | 62 | 53 |
| | retention rate of tensile elongation at break after treatment with boiling water | % | 97 | 97 | 96 | 97 | 97 |
| | stability of extruded strand | — | ⊙ | ○ | ○ | ○ | Δ |

| | | | Comparative Example 6 | Comparative Example 7 | Comparative Example 8 | Comparative Example 9 |
|---|---|---|---|---|---|---|
| Compounding composition (part(s) by mass) | thermoplastic polyester elastomer | A-1 | 80 | 30 | | |
| | | A-2 | | | 80 | |
| | | A-3 | | | | |
| | | A-4 | | | | 80 |
| | hydrogenated styrene-type elastomer | B-1 | 20 | 70 | 20 | 20 |
| | | B-2 | | | | |
| | carbodiimide compound | C-1 | 1.0 | 1.0 | | 1.0 |
| | | C-2 | | | | |
| | antioxidant of a hindered phenol type | D-1 | 0.5 | 0.5 | 0.5 | 0.5 |
| | | D-2 | | | | |
| | antioxidant of a sulfur type | E | | 0.5 | 0.5 | 0.5 |
| | antioxidant of a phosphorus type | — | 0.5 | | | |
| Characteristics | (initial) tensile strength at break | MPa | 21 | 7 | 26 | 19 |
| | (initial) tensile elongation at break | % | 680 | 500 | 620 | 730 |
| | retention rate of tensile elongation at break after thermal treatment | % | 68 | 38 | 94 | 19 |
| | retention rate of tensile elongation at break after treatment with boiling water | % | 97 | 88 | 21 | 93 |
| | stability of extruded strand | — | ○ | x | ○ | ○ |

As will be apparent from the results of Tables 3 and 4, the thermoplastic polyester elastomer compositions of the present invention in which a resin ingredient comprising the thermoplastic polyester elastomer and the modified hydrogenated styrene-type elastomer is compounded with a carbodiimide compound, an antioxidant of a hindered phenol type and an antioxidant of a sulfur type shown in Examples 1 to 11 have the retention rate of tensile elongation at break of 80% or more after subjecting to a thermal treatment of 150° C. for 250 hours, which means very excellent thermal aging resistance. Further, the retention rate of tensile elongation at break after the treatment with boiling water of 100° C. for 350 hours is also 70% or more, which means high resistance to hydrolysis. Moreover, with regard to the stability of extruded strand which is an index for stable production, good result is achieved. On the contrary, in the compositions of Comparative Examples 1 to 9 which do not satisfy the conditions of the present invention, any of the thermal aging resistance and hydrolysis resistance is inferior as compared with the compositions of the present invention.

In Comparative Example 1, modified hydrogenated styrene-type elastomer is not compounded. In Comparative Examples 2 to 4, none of or only one kind of the antioxidant is compounded. In Comparative Example 5, unmodified hydrogenated styrene-type elastomer is compounded. In Comparative Example 6, an antioxidant of a sulfur type is changed to that of a phosphorus type. In any of Comparative Examples 1-6, the retention rate of tensile elongation at break after subjecting to a thermal treatment of 150° C. for 250 hours is less than 70% whereby the thermal aging resistance is inferior. In Comparative Example 7 wherein the compounding amount of the modified hydrogenated styrene-type elastomer is more than the condition of the present invention, not only the thermal aging resistance lowers but also the strand is pulsated whereby stable production is not possible. In Comparative Example 8 wherein carbodiimide compound is not compounded, the retention rate of tensile elongation at break after the treatment with boiling water of 100° C. for 350 hours is less than 60% whereby the resistance to hydrolysis is inferior. In Comparative Example 9 wherein the content of the soft segment ingredient in the polyester elastomer is more than the condition of the present invention, its resistance to hydrolysis is also inferior.

INDUSTRIAL APPLICABILITY

The thermoplastic polyester elastomer composition according to the present invention is flexible and exhibits well-balanced thermal aging resistance and water resistance. Accordingly, it can be advantageously used in parts around an engine of a car or particularly in intake parts of an internal combustion engine such as air ducts, resonators, side branches and air cleaners which requires heat resistance.

The invention claimed is:

1. A thermoplastic polyester elastomer composition wherein, to 100 parts by mass in total of a thermoplastic polyester elastomer (A) and a modified hydrogenated styrene elastomer (B), 0.1 to 10 part(s) by mass of a carbodiimide compound (C), 0.01 to 5 part(s) by mass of a hindered phenol antioxidant (D) and 0.01 to 5 part(s) by mass of a sulfur antioxidant (E) are contained,
   wherein the thermoplastic polyester elastomer (A) comprises a hard segment comprising a polyester constituted from an aromatic dicarboxylic acid and an aliphatic diol or an alicyclic diol and a soft segment comprising an aliphatic polyether as main constituent ingredients, wherein a content of the soft segment is 3 to 40% by mass,
   wherein a rate by mass of the above (A) to the above (B) ((A)/(B)) is from 95/5 to 65/35, and
   wherein, in a tensile test measured in accordance with JIS K6251:2010, initial tensile elongation at break of a molded product produced from the thermoplastic polyester elastomer composition is 550% or more, a retention rate (%) of tensile elongation at break of the molded product after a thermal treatment at 150° C. for 250 hours is 70% or more, and a retention rate (%) of tensile elongation at break of the molded product after a treatment with boiling water of 100° C. for 350 hours is 60% or more.

2. The thermoplastic polyester elastomer composition according to claim 1, wherein the hard segment which is a constituent ingredient of the thermoplastic polyester elastomer (A) is constituted from polybutylene terephthalate.

3. The thermoplastic polyester elastomer composition according to claim 1, wherein the soft segment which is a constituent ingredient of the thermoplastic polyester elastomer (A) is constituted from poly(tetramethylene oxide) glycol (PTMG) and/or an addition polymer wherein ethylene oxide is added to poly(propylene oxide) glycol (addition polymer of PPG with EO).

4. The thermoplastic polyester elastomer composition according to claim 1, wherein the modified hydrogenated styrene elastomer (B) is a modified hydrogenated block copolymer of styrene with butadiene.

5. The thermoplastic polyester elastomer composition according to claim 1, wherein the carbodiimide compound (C) is a polycarbodiimide compound wherein a number of carbodiimide group is 2 to 50 and a content of isocyanate group is 0 to 5% by mass.

6. A molded product made from the thermoplastic polyester elastomer composition according to claim 1.

7. The molded product according to claim 6, wherein the molded product is intake parts of an internal combustion engine.

8. The molded product according to claim 7, wherein the intake parts of an internal combustion engine are selected from the group consisting of air ducts, resonators, side branches and air cleaners.

9. The thermoplastic polyester elastomer composition according to claim 1, wherein the composition is additionally compounded with additives other than the antioxidants (D) and (E),
   wherein the additives other than the antioxidants (D) and (E) are selected from the group consisting of hindered amine light stabilizers, triazole light stabilizers, benzophenone light stabilizers, benzoate light stabilizers, nickel light stabilizers, salicylic light stabilizers, antistatic agents, lubricants, peroxide adjusting agents for molecular weights, inactivating agents for metal, organic nucleating agents, inorganic nucleating agents, neutralizing agents, antacids, antibacterial agents, fluorescent whiteners, fillers, flame retardants, auxiliary flame retardants, organic pigments and inorganic pigments.

* * * * *